Jan. 2, 1962 T. F. HEWINS 3,015,714
MAGNETIC FORCE WELDING APPARATUS
Filed Sept. 15, 1960 4 Sheets-Sheet 1

INVENTOR
THOMAS F. HEWINS

BY W. E. Sherwood

ATTORNEY

Jan. 2, 1962     T. F. HEWINS     3,015,714
MAGNETIC FORCE WELDING APPARATUS
Filed Sept. 15, 1960     4 Sheets-Sheet 2
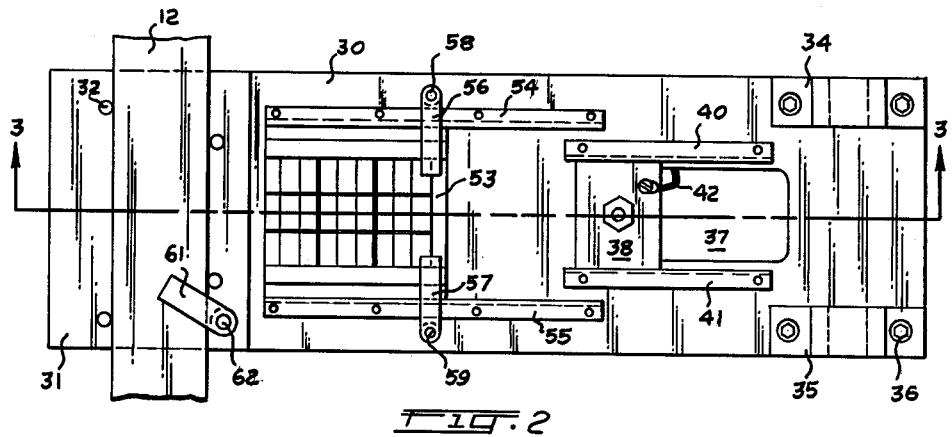
Fig. 2
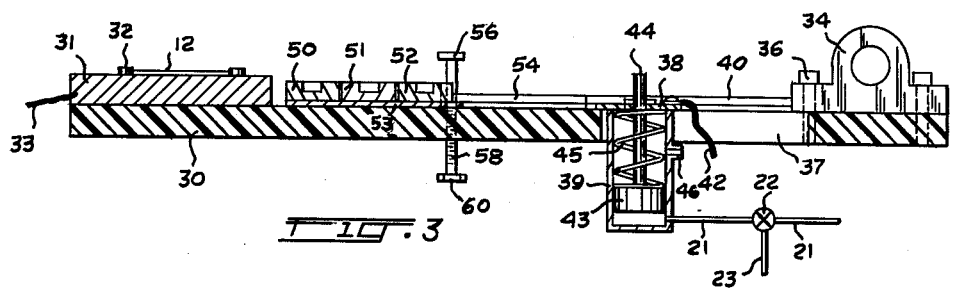
Fig. 3
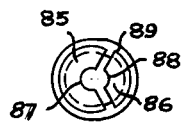
Fig. 6
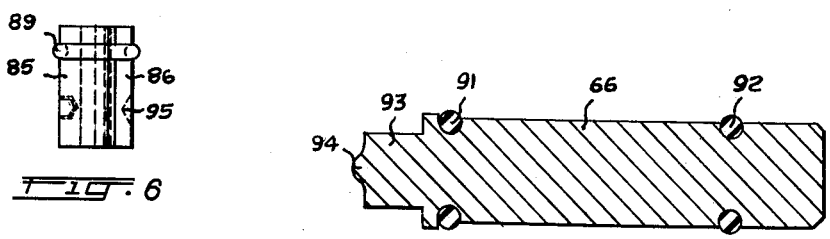
Fig. 9
Fig. 7
INVENTOR
THOMAS F. HEWINS
BY W. E. Sherwood
ATTORNEY Jan. 2, 1962 T. F. HEWINS 3,015,714
MAGNETIC FORCE WELDING APPARATUS
Filed Sept. 15, 1960 4 Sheets-Sheet 3
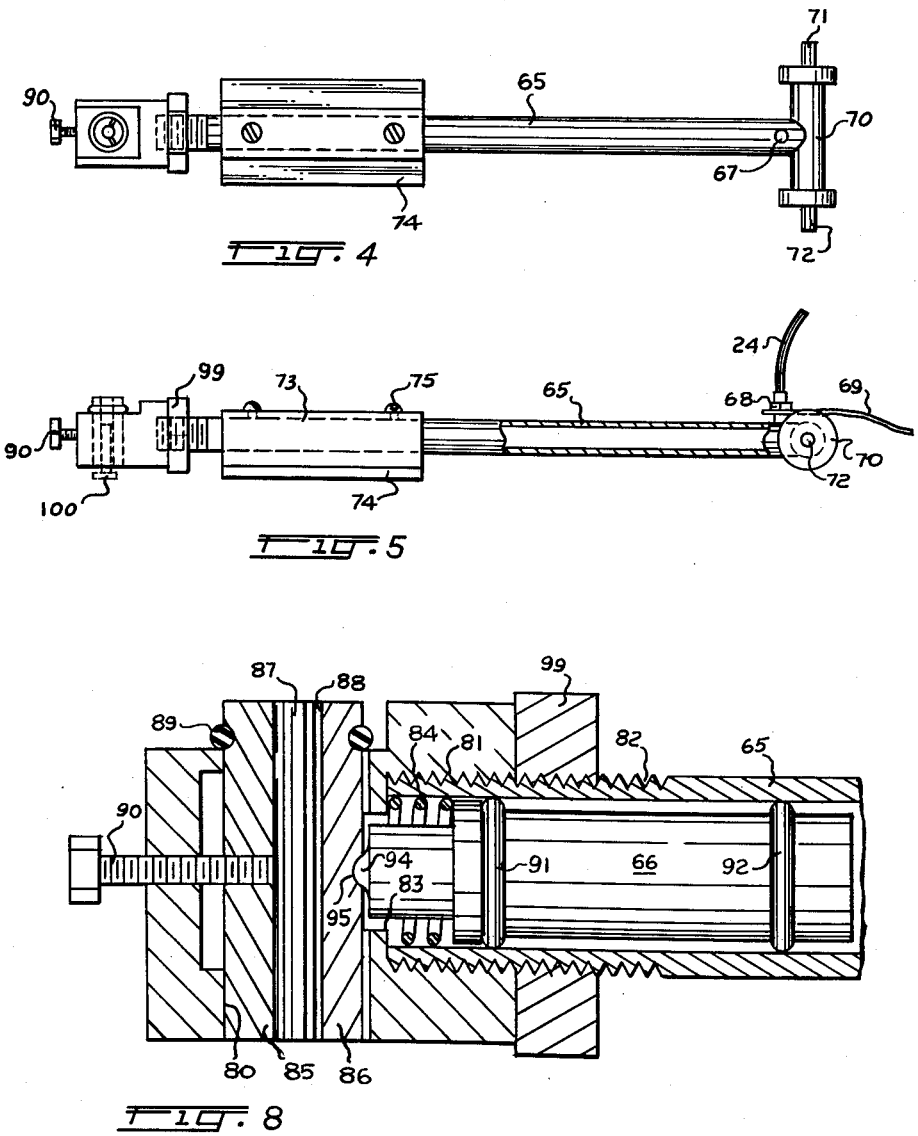
INVENTOR
THOMAS F. HEWINS
BY W. E. Sherwood
ATTORNEY

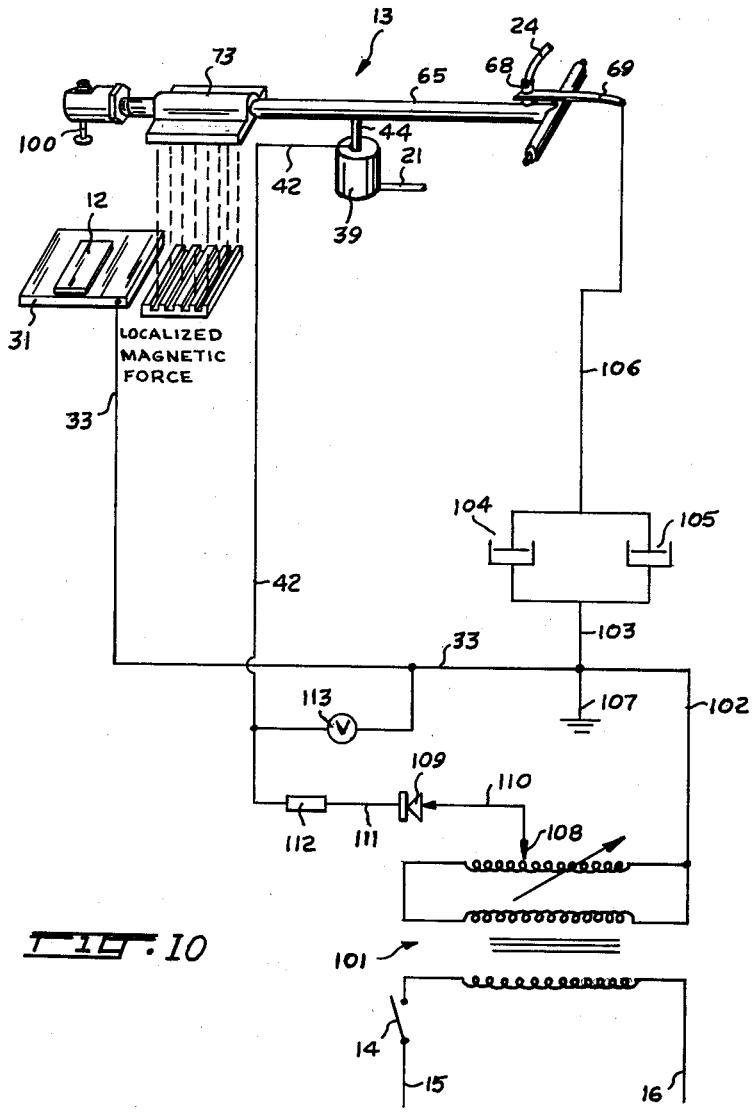

United States Patent Office 3,015,714
Patented Jan. 2, 1962

3,015,714
MAGNETIC FORCE WELDING APPARATUS
Thomas F. Hewins, 1917 Bellefonte Drive, Lexington, Ky.
Filed Sept. 15, 1960, Ser. No. 56,138
12 Claims. (Cl. 219—95)

This invention relates to an improved welding apparatus for the percussion welding of a stud to a workpiece and, more particularly, to an apparatus of the type employing magnetic force for urging the stud toward the workpiece.

Various proposals have been made heretofore for increasing the contact pressure between electrodes during a stud welding operation in order to provide a strong weld, and have included the use of mechanical means, such as springs, fluid driven pistons, or magnetic forces which are operable during the flow of the welding current. Despite the use of such means, a continued study for improvement in such welding procedures is currently being conducted by many investigators and the present invention affords an advantageous contribution to such work. As is known, when the stud is first brought into contact with, or in close proximity to, a workpiece, an arc of ionized vapor is produced with development of high pressures and with intense heating of the confronting faces of the stud and workpiece. At this optimum moment, means should be available to force the stud into, and hold it in, the molten pool of metal before the metal cools as a result of the cessation of the flow of welding current. Moreover, since the pressure developed during the initial contact tends to separate the stud from the workpiece, and since the flow of welding current ceases quickly after such pressure is developed, it is desirable, if not essential, that the stud be given an immediate impulse moving it again into contact with the workpiece and forcibly holding it in such contact while the metal cools. The present invention makes possible such a procedure and has as an object the provision of an improved apparatus for forming a strong weld between the stud and the workpiece, employing this procedure.

Another object of the invention is to provide a simplified apparatus for welding a stud to a workpiece and without requiring a special shape of stud.

Another object is to provide an improved stud welding apparatus which is adjustable for studs of varying lengths.

Another object is to provide an improved stud welding apparatus employing a combined gravity and magnetic force to carry the stud against the workpiece.

Another object is to provide an apparatus giving an improved centering of the stud upon the workpiece by a combined mechanical and magnetic centering arrangement.

A further object is to provide an apparatus in which the strength of the weld may be tested before the grip of the apparatus on the stud is released.

A still further object is to provide an electrically conductive means for holding a stud to be welded to a workpiece and in which arcing within the stud holding means is substantially eliminated.

Other objects and advantages of the invention will become more apparent as the description proceeds and when considered in conjunction with the accompanying drawings in which:

FIG. 2 is a plan view of the base portion of one form of welding unit employing the invention and with the pivoted arm removed;

FIG. 3 is a sectional view taken on line 3—3 of FIG. 2;

FIG. 4 is a plan view of the pivoted arm employed with the base portion seen in FIG. 2;

FIG. 5 is a side elevation view of the arm of FIG. 4 with portions broken away;

FIG. 6 is a side elevation view of one form of two-part collet suitable for use with the arm of FIGS. 4 and 5 and drawn to a larger scale;

FIG. 7 is an end view of the collet of FIG. 6;

FIG. 8 is a sectional view to an enlarged scale of the assembled collet and arm;

FIG. 9 is a longitudinal sectional view through the collet-closing piston; and

FIG. 10 is a diagrammatic view indicating a preferred form of electrical circuit for use in carrying out the invention.

Figure 1:
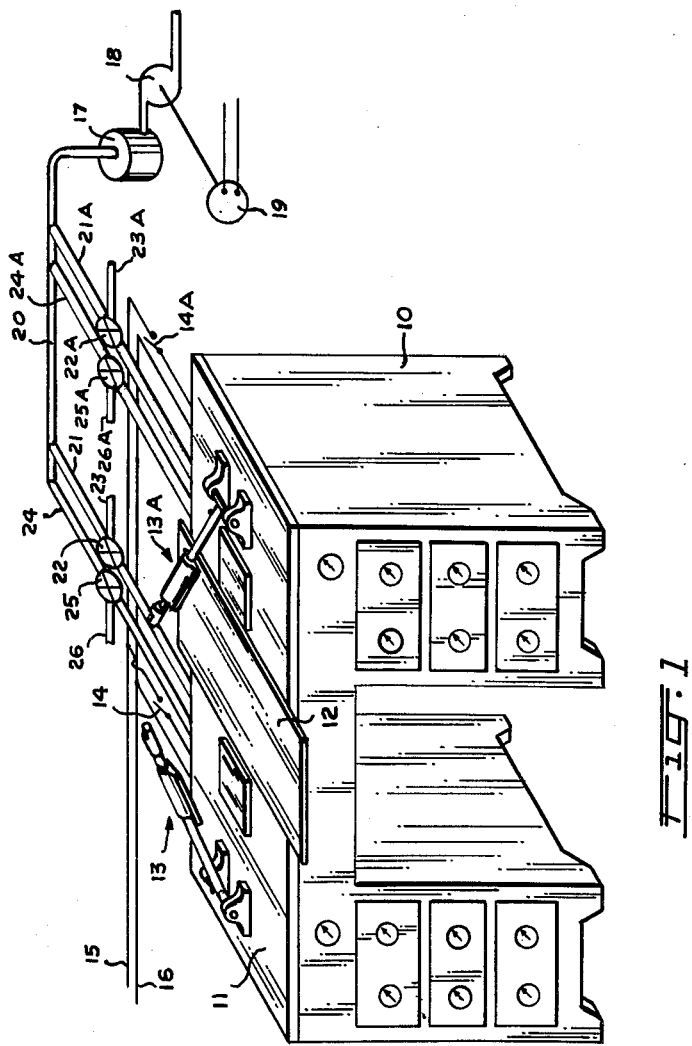
FIG. 1 is a schematic view of an apparatus employing the invention with a plurality of welding units, and diagrammatically indicating the several connections to the apparatus.

In accordance with the invention, the apparatus is provided with a pivotally mounted arm carrying a collet which holds the stud to be welded to a workpiece resting upon a stationary base portion of the apparatus. Means for accurately positioning the arm prior to its pivoted fall to welding position are provided in combination with magnetic means serving to urge the stud toward the workpiece prior to, during and following the flow of welding current, and cooperating to give an improved centering of the stud at the precise location desired on the workpiece and an improved weld of stud to workpiece.

Referring first to FIG. 1, the invention is adapted for use either with a single welding unit or with a plurality of closely spaced welding units controlled by a single operator. For example, a level work bench 10 may have a flat upper surface 11 on which a workpiece 12 may be registered for having studs welded thereto by welding units indicated generally at 13, 13A. Leading into the bench at a convenient location and diagrammatically shown in extended positions for purposes of clarity, are the necessary electrical and fluid pressure lines employed in connection with the invention. The electrical components may include conductors controlled by switches 14, 14A and leading from the line conductors 15 and 16 to the power units serving the respective welding units, and such power units may be conveniently housed in drawer-like compartments within the workbench. It will be understood that the necessary manual controls, safety devices, means for actuating switches 14 and 14A, means for actuating valves of the fluid pressure systems, and the like, are so connected as to be operated from a convenient station near the work.

The fluid pressure system may include a reservoir 17 for storing air furnished by pump 18 and driven by an electrical motor 19, this reservoir having connected thereto a manifold 20. From the manifold, first conduits 21 and 21A controlled by three-way valves 22 and 22A connected to vents 23 and 23A lead to the arm positioning cylinders later to be described. Also from the manifold, second conduits 24 and 24A controlled by three-way valves 25 and 25A connected to vents 26 and 26A lead to the pivoted arms, as will later appear.

Considering now a single welding unit 13 as shown in FIGS. 2 to 5, an elongated base portion 30 formed of a dielectric, such as any of the several commercially available plastics, is provided at one end with anvil member 31 of metallic material having register pins or the like 32 for positioning the workpiece 12 thereon and with an electrical conductor 33 attached thereto. At its other end the base portion supports a pair of spaced bearing housings 34 and 35 having apertures therein for receiving dielectric bearing bushings (not shown) and being detachably affixed to the base portion as by screws 36. Intermediate its ends the base portion is provided with an elongated slot 37 along which an adjustable metallic plate 38 forming the upper end of a cylinder 39 may be selectively positioned and clamped in position by side clamps 40 and 41. Attached to this plate is an electrical conductor 42. Mounted within the cylinder 39 is a piston 43 having a metallic piston rod 44 projecting above the plate 38 and in slidable contact therewith, a compression spring 45 being housed within the cylinder between the piston and end plate. Beneath the piston the fluid pressure line 21 is connected to the cylinder and a vent 46 extends from the cylinder above the piston.

As a feature of the invention, the base portion supports an array of strong permanent magnet groups 50, 51 and 52 having flat upper surfaces and which groups conveniently may be mounted upon a flat plate 53 held in a selected position longitudinally of the base portion, as by means of side clamping bars 54 and 55. The upper surfaces of these magnets are positioned to provide an extremely thin air space between the same and the flat, lower surface of an armature when such armature is in its lowermost position. Moreover, the uppermost position which such armature can assume, is limited to that permitted by a suitable latching means engaging the armature on its upper side. One convenient form of latching means may comprise rotatable arms 56 and 57, respectively, mounted at the upper ends of a pair of vertically adjustable rods 58 and 59, the rods being threadedly engaged in the base portion 30 and rotatable as by means of thumb screws one of which is seen at 60.

One or more latches for holding the work piece 12 in contact with the anvil also is provided, and as seen in FIG. 2 may include a rotatable arm 61 pivotable about a vertically arranged rod 62 fastened in the anvil 31.

For cooperation with the above-described stationary base portion a pivoted arm 65 such as seen in FIGS. 4, 5 and 8 is employed and preferably comprises a hollow metal cylinder within which is housed a free piston 66. Adjacent its pivoted end the arm includes an aperture 67 to which a flexible fluid pressure line connected to the second conduit 24 is attached as by means of a metallic fitting 68 forming a terminal for a flexible woven metallic conductor 69. The arm 65 moreover is rigidly affixed to a transversely extending solid shaft 70 having axially projecting pins 71 and 72 adapted to be encased in dielectric bearings, such as nylon, and with these bearings mounted in the stationary housings 34 and 35, above-described. Intermediate the ends of the arm is a heavy metallic block 73 serving as an armature and having a flat lower face 74 and with an aperture extending through the block for adjustable mounting of the same longitudinally of the arm as by set screws 75. The relative size and location of the armature and of the magnets is such that during movement of the armature toward the magnets, a centering action of the stud with respect to the workpiece is assured.

The outer end of the pivoted arm is adapted to support the member for detachably holding the stud to be welded to the workpiece, which member may take various forms without departing from the invention. One such member is best shown in FIG. 8 and comprises a hammer-head element provided with a cylindrical first bore 80 extending therethrough and with a laterally extending second bore communicating with the first bore and interiorly threaded as at 81 for engagement with an external thread 82 on the arm. An inwardly directed shoulder 83 extending into the lateral bore serves as an abutment for a compression spring 84 coacting with piston 66 in a manner later to be seen. The cylindrical bore includes a circular portion and a non-circular portion when viewed in cross section and within this bore a two-part collet is adapted to be removably inserted. As seen in FIGS. 6, 7 and 8, the collet may comprise a circular portion 85 held in contact with the interior surface of the first bore through at least 180° of the circumference thereof and a smaller circular portion 86 confined within the supplementary non-circular portion of the first bore of the hammer-head and having sufficient clearance therein to permit insertion of the stud in the collet. The confronting faces 87 and 88 of the two collet portions are cylindrically shaped to conform to the periphery of the shank of the stud and to engage the same with a tight fit. Each collet portion extends above the top edge of the hammer-head and contains a peripheral groove within which a flexible O-ring 89 is secured, this ring permitting swinging movement of the small collet portion 86 with respect to the larger portion 85 without detachment of the parts from each other. Preferably, the larger portion 85 is rigidly held in place during use as by means of a threaded screw 90 passing through the side of the hammer-head and engaging with a threaded aperture in the collet portion 85.

The form of hammer-head and collet thus described is held in fixed position upon the pivoted rod by means of a lock unit 99, and the stud 100 is manually placed within the collet from the lower end of that collet. It is within the purview of the invention, however, to employ a turret-type of hammer-head rotatably mounted upon the end of the pivoted arm through a 360° traverse, and adapted for automatic loading of the studs thereinto. Thus, the form of stud loading herein shown is considered to be illustrative, rather than limiting insofar as the invention is considered.

As seen in FIGS. 8 and 9, the pivoted hollow arm encloses an elongated, preferably solid, piston 66 having grooves adjacent its ends into which sealing O-rings 91 and 92 are positioned. The forward end of the piston includes a cylindrical projection 93 carrying at its end a collet-engaging nose 94. This nose is adapted to become centered in a small dimple 95 in the side of the smaller collet portion and to move that portion into tight engagement with the stud 100 (FIG. 5) when the piston is moved fully forward by the fluid pressure within the arm.

In general, it has been found that when the upper edge of the shank of the stud rests in contact with the collet portions just above the plane including the dimple 95 and the axis of screw 90, sufficient holding contact upon the stud for weld testing purposes is provided and at the same time the collet portion 86 will shift sufficiently to disengage the hammer-head from the welded stud as the arm is pivoted upwardly at the conclusion of the welding operation. In general, an air pressure of about 100 p.s.i. applied to the large end of piston 66 serves to hold the collet portion 86 tightly against the stud and since that stud also is resting in tight contact with the other collet portion 85, no arcing between collet and stud will occur when the flow of welding current takes place. The apparatus, moreover, is especially well adapted for welding studs of different lengths, each of such studs being confined at their upper end in the same collet in the described manner. Assuming that a stud appreciably longer than stud 100 were to be used, a pair of bearing housing having their axial apertures a commensurately greater distance from the base portion 30 would be substituted, and a substitute armature having its lower surface 74 a commensurately greater distance from the arm 65 would be substituted, the remainder of the apparatus being unchanged.

The invention also provides for variation of the distance through which the pivoted arm may fall, as may be required when special types of studs are to be welded to special types of workpieces. Merely by adjusting the heights of latches 56 and 57 and by shifting the plate 38 along the slot 37, the leverage on the pivoted arm may be suitably varied for that purpose.

Considering now FIG. 10, one satisfactory electrical circuit for use with the invention may include a transformer 101, the primary of which is connected to a 220 volt, single phase, source through conductors 15 and 16 and controlled by switch 14. The secondary of the transformer through a conventional variable voltage means may have one conductor 102 connected to the input line 103 leading to a plurality of capacitors 104 and 105 which jointly have an output line 106 leading to the conductor 69 attached to the pivoted arm 65. The input line to the condensers is grounded at 107 and the anvil 31 is connected to the same ground through conductor 33. The other line from the variable voltage transformer includes an adjustable contact 108 connected to rectifier 109 by conductor 110. The rectified current passes through conductor 111, a limiting resistor 112, for example, of about 10 ohms, and thence through conductor 42 to the arm-positioning piston rod 44. A voltmeter 113 also may conveniently be connected across conductors 42 and 33.

As will thus be seen, the power source is adapted to supply to the electrodes of the welding system a single, unidirectional pulse of energy during each welding operation. The components of the power source are conventional and may be packaged for ready insertion and removal in a cabinet of the type shown in FIG. 1.

Having thus described one form of apparatus for carrying out the invention, the several objects and advantages inherent in the invention will now be seen in connection with the following description of the operation of such apparatus.

With the workpiece 12 in proper register, the operator actuates valve 22 to supply fluid below piston 43, thus raising the piston rod 44 into contact with the lower side of arm 65 and pivoting that arm upwardly about its engagement with the bearing housings. It will be understood that the height of those housings above the base portion of the unit, as well as the distance which the face 74 of the armature extends downwardly from the arm, are related to the length of the shank of the stud 100 and that the upward movement of the hammer-head provides sufficient space for insertion of the shank of the stud endwise into the collet. At this time the arm is restrained against further upward movement by engagement of the upper surfaces of the armature under the latches 56 and 57 and the loaded assembly possesses a predetermined amount of potential energy later to be manifested by its free gravity fall. At the same time, the pull of the magnets upon that armature is greatly attenuated due to the distance therebetween. Having loaded the stud in the collet, the operator then actuates valve 25 placing fluid pressure upon piston 66 which then moves forward, compressing spring 84, and causing the nose 94 to act against the collet portion 86 holding the stud securely in place. With the stud thus held, switch 14 is closed, establishing a circuit through the capacitors and charging the pivoted arm 65. Promptly thereafter, the operator shifts valve 22 venting the fluid below piston 43 into vent line 23 and permitting the spring 45 to function and to pull the arm positioning rod 44 away from the arm 65. Immediately after this occurs the following significant welding steps take place.

Firstly, charged arm 65 having the heavy armature at a substantial distance from its pivot axis falls with appreciable force under the acceleration of gravity and with the superimposed acceleration caused by the permanent magnets pulling that armature toward themselves. These combined forces cause the stud head to strike the workpiece with a percussive impact and at the instant of contact the capacitors begin their discharge of stored current causing the arc between the stud and workpiece to form.

Secondly, as this arc is struck, an intense surface heating occurs, generating the usual plasma pressure and tending to force the stud upwardly from the workpiece. This pressure, coupled with the mechanical "bounce" of the pivoted arm attenuates the arc which is then forming a layer of molten metal on the faces of the stud and workpiece, and tends to lift the arm 65 upwardly against the snubbing action of the magnets. A slight upward movement, perhaps in the order of 0.005 inch, may occur and is then followed immediately by the forging action characteristic of the invention.

Thirdly, as the slightly lifted arm moves downward the decaying arc and decaying plasma pressure interposes substantially no resistance to the movement of the stud, and the arm, under the influence of the magnets, carries the stud with a forging blow into the pool of molten metal without any second "bounce" or vibration tremors which might harm the weld. Moreover, following this forging, the action of the magnets is at its maximum and is sufficiently strong to hold the stud firmly to the workpiece as the metal cools. In contrast with conventional apparatus employing springs or air pressure to give a forging action, the present structure has no time delay or inertia to overcome and may take full advantage of the forging while the metal is in molten condition.

Following the cooling of the welded stud either of two procedures may be employed. The operator may promptly open switch 14, actuate valve 25 to release pressure upon piston 66, and then actuate valve 22 to lift the arm for loading of the next stud. Or if it is desired to test the strength of the weld, he may lift the arm while still holding pressure upon piston 66. In this case, the collet portion 86 retains its grip upon the welded stud and as the arm 65 attempts to lift under the action of piston rod 44, the collet then places a pull upon the stud and such pull may serve to test the integrity of the weld.

The employment of permanent magnets not only serves to assist in the significant forging weld action, but also offers the advantages of simplicity of construction. When, after a long continued period of use, their magnetism is partially dissipated, the invention contemplates that the mounting plate 53 therefor will be disengaged from the clamps 54, 55 and placed in a suitable recharging fixture, not shown, whereupon a discharge of direct current through the magnets will promptly restore them for further usage. Numerous practical advantages of the invention as embodied in the described apparatus will now be obvious, including ease of maintenance, lack of arcing within the collet, elimination of lubrication of moving parts, and ease of testing of a weld.

While in accordance with the patent statutes I have shown what at present is considered to be the preferred embodiment of my invention, it will be obvious to those skilled in the art that various changes and modifications may be made therein without departing from my invention, and I, therefore, aim, in the appended claims, to cover all such changes and modifications as fall within the true spirit and scope of the invention.

What is claimed is:

1. Welding apparatus for percussion welding of a stud to a workpiece comprising, a pivotally mounted arm biased for travel toward said workpiece, a collet mounted on said arm adjacent one end thereof for detachably holding a stud, arm-positioning means movable between a first position holding said stud out of contact with said workpiece and a second position permitting said stud to approach and to contact said workpiece, means for actuating said arm-positioning means, an electric power source connected between said arm and said workpiece and adapted to establish a flow of welding current upon contact of said stud with said workpiece, and magnetic means operable to urge said stud toward said workpiece immediately prior to, during, and following the flow of said welding current.

2. Welding apparatus for percussion welding of a stud to a workpiece comprising, a pivotally mounted arm biased for travel toward said workpiece, a collet mounted on said arm adjacent one end thereof for detachably holding a stud, arm-positioning means movable between a first position holding said stud out of contact with said workpiece and a second position permitting said stud to approach and to contact said workpiece, a fluid pressure system, said arm-positioning means including a cylinder attached to said fluid pressure system, a piston in said cylinder, and a piston rod projecting from said cylinder into the path of travel of said arm, means for controlling the application of fluid pressure to said cylinder for moving said piston rod between said first and second positions, an electric power source connected between said arm and said workpiece and adapted to establish a flow of welding current upon contact of said stud with said workpiece, and magnetic means operable to urge said stud to said workpiece immediately prior to, during and following the flow of said welding current.

3. Apparatus as defined in claim 2 wherein said piston rod forms part of the electrical circuit of said apparatus.

4. Welding apparatus for percussion welding of a stud to a workpiece comprising a hollow pivotally mounted arm biased for travel toward said workpiece, a collet mounted on said arm adjacent one end thereof for detachably holding a stud, a piston in said arm adapted in a first position to engage said collet for stud holding and in a second position to disengage said collet for stud releasing, a fluid pressure system, means connecting said fluid pressure system to said hollow arm for effecting movement of said piston therein, arm positioning means movable between a first position holding said stud out of contact with said workpiece and a second position permitting said stud to approach and to contact said workpiece, means for actuating said arm-positioning means, an electric power source connected between said arm and said workpiece and adapted to establish a flow of welding current upon contact of said stud with said workpiece, and magnetic means operable to urge said stud toward said workpiece immediately prior to, during, and following the flow of said welding current.

5. Welding apparatus for percussion welding of a stud to a workpiece comprising, a hollow pivotally mounted arm biased for travel toward said workpiece, a collet mounted on said arm adjacent one end thereof for detachably holding a stud, a piston in said arm adapted in a first position to engage said collet for stud holding and in a second position to disengage said collet for stud releasing, a fluid pressure system, means connecting said fluid pressure system to said hollow arm for effecting movement of said piston therein, arm-positioning means movable between a first position holding said stud out of contact with said workpiece and a second position permitting said stud to approach and to contact said workpiece, said arm-positioning means including a cylinder attached to said fluid pressure system, a piston in said cylinder, and a piston rod projecting from said cylinder into the path of travel of said arm, means for controlling the application of fluid pressure to said cylinder for moving said piston rod between said first and second positions of said arm-positioning means, an electric power source connected between said arm and said workpiece and adapted to establish a flow of welding current upon contact of said stud with said workpiece, and magnetic means operable to urge said stud toward said workpiece immediately prior to, during, and following the flow of said welding current.

6. Apparatus as defined in claim 5 including means for simultaneously holding said piston in said arm in contact with said collet and applying fluid pressure to said piston in said cylinder following completion of a weld thereby to test the integrity of said weld.

7. In a welding system functioning upon supply thereto of a single unidirectional pulse of electrical energy, the combination comprising, a pair of relatively movable welding electrodes, a stationary permanent magnet, a movable armature rigidly connected to one of said electrodes and acted upon by said magnet to urge said one electrode toward the other electrode immediately prior to, during and following the supply of said pulse, and means to supply to a series circuit of said electrodes a single unidirectional pulse of electrical energy thereby to effect a weld during the action of said magnet upon said armature.

8. In a welding system functioning upon supply thereto of a single unidirectional pulse of electrical energy, the combination comprising, a stationary electrode, a movable electrode arranged to fall by gravity toward said stationary electrode, a stationary permanent magnet, an armature rigidly connected to said movable electrode and acted upon by said magnet to supplement the force of gravity in urging said movable electrode toward said stationary electrode immediately prior to, during and following the supply of said pulse, and means to supply to a series circuit of said electrodes a single unidirectional pulse of electrical energy during the action of said magnet upon said armature.

9. A welding apparatus comprising a base portion supporting a fixed electrode, means mounted upon said base portion and supporting a movable electrode, means for selectively moving said movable electrode toward and from said fixed electrode, permanent magnet means operative to resist the separating movement of said movable electrode from said fixed electrode and to assist the approaching movement of said movable electrode toward said fixed electrode, and means for supplying a single, unidirectional pulse of electrical energy to a series circuit including said electrodes while said magnet means is exerting its maximum resistance to separating movement of said electrodes.

10. Apparatus as defined in claim 9 wherein said means supporting said movable electrode includes a pivoted arm mounted adjacent one end upon spaced fixed bearing housings and serving to direct said movable electrode toward said fixed electrode in a fixed arc of travel thereby to provide accurate register of said movable electrode with respect to said fixed electrode.

11. A welding apparatus comprising a base portion supporting a fixed electrode, an arm pivoted adjacent one end upon fixed spaced bearing housings and supporting a movable electrode adjacent its other end, arm-positioning means mounted upon said base portion and movable between a first position holding said electrodes spaced from each other and a second position permitting said movable electrode to approach and to contact said fixed electrode, means for actuating said arm-positioning means, permanent magnet means operative to resist the separation of said electrodes and to assist in the approaching movement of said movable electrode toward said first electrode, and means for supplying a single, unidirectional pulse of electrical energy to a series circuit including said electrodes while said magnet means is exerting its maximum resistance to separating movement of said electrodes.

12. Apparatus as defined in claim 11 wherein said arm is adapted to move toward said fixed electrode under the influence of gravity when said arm-positioning means moves to its second position.

References Cited in the file of this patent

UNITED STATES PATENTS

| 1,078,675 | Heany | Nov. 18, 1913 |
|---|---|---|
| 1,332,155 | Apple | Feb. 24, 1920 |
| 2,892,068 | Park et al. | June 23, 1959 |
| 2,905,804 | Wakeley | Sept. 22, 1959 |

FOREIGN PATENTS

| 371,066 | Germany | Mar. 10, 1923 |